United States Patent
Jong et al.

(10) Patent No.: US 6,737,892 B2
(45) Date of Patent: May 18, 2004

(54) METHOD AND APPARATUS FOR DETECTING VALID CLOCK SIGNALS AT A CLOCK RECEIVER CIRCUIT

(75) Inventors: Jyh-Ming Jong, Saratoga, CA (US); Chung-Hsiao Wu, Sunnyvale, CA (US); Prabhansu Chakrabarti, Sunnyvale, CA (US); Leo Yuan, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 607 days.

(21) Appl. No.: 09/741,485

(22) Filed: Dec. 18, 2000

(65) Prior Publication Data

US 2002/0078392 A1 Jun. 20, 2002

(51) Int. Cl.[7] .................................................. H03K 5/19
(52) U.S. Cl. ............................. 327/18; 327/20; 327/65; 327/89
(58) Field of Search ............................. 327/18, 20, 65, 327/66, 90, 89, 68, 70

(56) References Cited

U.S. PATENT DOCUMENTS

| | | | | | |
|---|---|---|---|---|---|
| 4,465,379 | A | * | 8/1984 | Misawa et al. | 368/202 |
| 6,198,310 | B1 | * | 3/2001 | Lohmueller | 327/20 |
| 6,593,801 | B1 | * | 7/2003 | Hattori | 327/544 |

* cited by examiner

Primary Examiner—Tuan T. Lam
(74) Attorney, Agent, or Firm—Park, Vaughan & Fleming LLP

(57) ABSTRACT

One embodiment of the present invention provides a system for detecting a valid clock signal at a clock receiver. The system operates by receiving a clock signal at the clock receiver, and directing the clock signal into a control input of a voltage-controlled variable resistor. Next, the system uses the voltage-controlled variable resistor to control a first current. A current mirror is then employed to create a second current from the first current. This second current passes through a resistor to produce a control voltage, which is amplified to produce a validity signal indicating whether or not the clock signal is valid. In one embodiment of the present invention, the system additionally uses at least one capacitor to filter out periodic fluctuations in the validity signal.

22 Claims, 5 Drawing Sheets

METHOD AND APPARATUS FOR DETECTING VALID CLOCK SIGNALS AT A CLOCK RECEIVER CIRCUIT

BACKGROUND

1. Field of the Invention

The present invention relates to clock signals and clocking circuitry in a digital system. More specifically, the present invention relates to a method and an apparatus for detecting valid clock signals at a clock receiver circuit.

2. Related Art

New systems for transferring data between computer system components have recently been developed to keep pace with processor clock speeds that continue to increase at an exponential rate. New "source synchronous" data transfer systems send a clock signal from a transmitting circuit to a receiving circuit along with accompanying data bits. This clock signal is used to clock the accompanying data bits into the receiving circuit. Note that using a source synchronous data transmission system allows the transmitting circuit and the receiving circuit to reside in different power and clock domains.

Unfortunately, sending a clock signal along with the data can make the data transfers susceptible to interruptions in the clock signal. Interruptions in the clock signal can occur in a number of ways. For example, interruptions in the clock signal can arise when a board is removed from a computer system, either accidentally or during a hot swap operation; when a clock wire is broken; or when power is interrupted.

Interruptions in the clock signal can cause a number of problems. If a clock line for some reason becomes disconnected, differential noise at the clock receiver can cause spurious oscillations in the received clock signal. This can cause invalid data values to be latched into the receiving circuit. Moreover, if these spurious oscillations occur high frequencies, the rapid switching of the associated clocking circuitry can cause power consumption at the receiving circuit to be extremely high, which can potentially damage the receiving circuitry.

Some existing system employ a clock receiver circuit with input hysteresis to prevent a clock receiver from misinterpreting noise as a valid clock signal. However, clock receivers with input hysteresis can introduce phase errors, which can adversely affect data transfer performance. Furthermore, conventional receiver circuits with input hysteresis cannot detect an interrupted clock signal, and consequently cannot generate a logic signal to indicate an interrupted clock signal. Hence, these system cannot take actions to mitigate the effects of an interrupted clock signal.

What is needed is a method and an apparatus for detecting an interrupted clock signal at a clock receiver circuit.

SUMMARY

One embodiment of the present invention provides a system for detecting a valid clock signal at a clock receiver. The system operates by receiving a clock signal at the clock receiver, and directing the clock signal into a control input of a voltage-controlled variable resistor. Next, the system uses the voltage-controlled variable resistor to control a first current. A current mirror is then employed to create a second current from the first current. This second current passes through a resistor to produce a control voltage, which is amplified to produce a validity signal indicating whether or not the clock signal is valid.

In one embodiment of the present invention, the system additionally uses at least one capacitor to filter out periodic fluctuations in the validity signal.

In one embodiment of the present invention, the clock signal is a differential clock signal that includes a first clock signal and a second clock signal. In this embodiment, the voltage-controlled variable resistor includes a first variable resistor in parallel with a second variable resistor, wherein the first clock signal is directed into a control input of the first variable resistor, and the second clock signal is directed into a control input of the second variable resistor.

In one embodiment of the present invention, the current mirror includes a first P-type transistor with a drain coupled to $V_{DD}$, and a source and a gate coupled to a first end of the voltage-controlled variable resistor, so that the first current flows through the first P-type transistor. The current mirror also includes a second P-type transistor with a drain coupled to $V_{DD}$, a gate coupled to the first end of the voltage-controlled variable resistor, and a source coupled to a first terminal of the control voltage and then to ground through a first resistor. In this embodiment, the second current flows through the second P-type transistor and is proportionate to the first current.

In one embodiment of the present invention, the current mirror includes a first N-type transistor with a drain coupled to ground, and a source and a gate coupled to a second end of the voltage-controlled variable resistor, so that the first current flows through the first N-type transistor. The current mirror also includes a second N-type transistor with a drain coupled to ground, a gate coupled to the second end of the voltage-controlled variable resistor, and a source coupled to a second terminal of the control voltage and then to $V_{DD}$ through a second resistor. In this embodiment, a third current flows through the second N-type transistor and is proportionate to the first current.

In one embodiment of the present invention, amplifying the control voltage to produce the validity signal involves using a differential receiver with a first input coupled to the first terminal of the control voltage and a second input coupled to the second terminal of the control voltage. The validity signal is the output of the differential receiver.

In one embodiment of the present invention, the first resistor and the second resistor are sized so that validity signal is asserted when both the first clock signal and the second clock signal are valid.

In one embodiment of the present invention, the first resistor and the second resistor are sized so that validity signal is asserted when at least one of the first clock signal and the second clock signal is valid.

In one embodiment of the present invention, the voltage-controlled variable resistor is implemented using at least one P-type transistor, wherein a gate input of the P-type transistor functions as the control-input of the voltage-controlled variable resistor.

In one embodiment of the present invention, the system additionally uses the validity signal to disable a data receiving circuit associated with the clock signal if the clock signal is not valid.

One embodiment of the present invention provides a system for detecting a valid clock signal at a clock receiver. This system operates by receiving a clock signal at the clock receiver, and directing the clock signal into a control input of a voltage-controlled variable resistor. Note that this voltage-controlled variable resistor is configured to remain in a high impedance state if the clock signal is floating. Next, the system uses the voltage-controlled variable resistor to control a first current, which is used to produce a control voltage. This control voltage is amplified to produce a validity signal indicating whether the clock signal is valid. The system additionally uses at least one capacitor to filter out fluctuations in the validity signal at the frequency of the clock signal.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Data Transfer Circuitry

Figure 1:
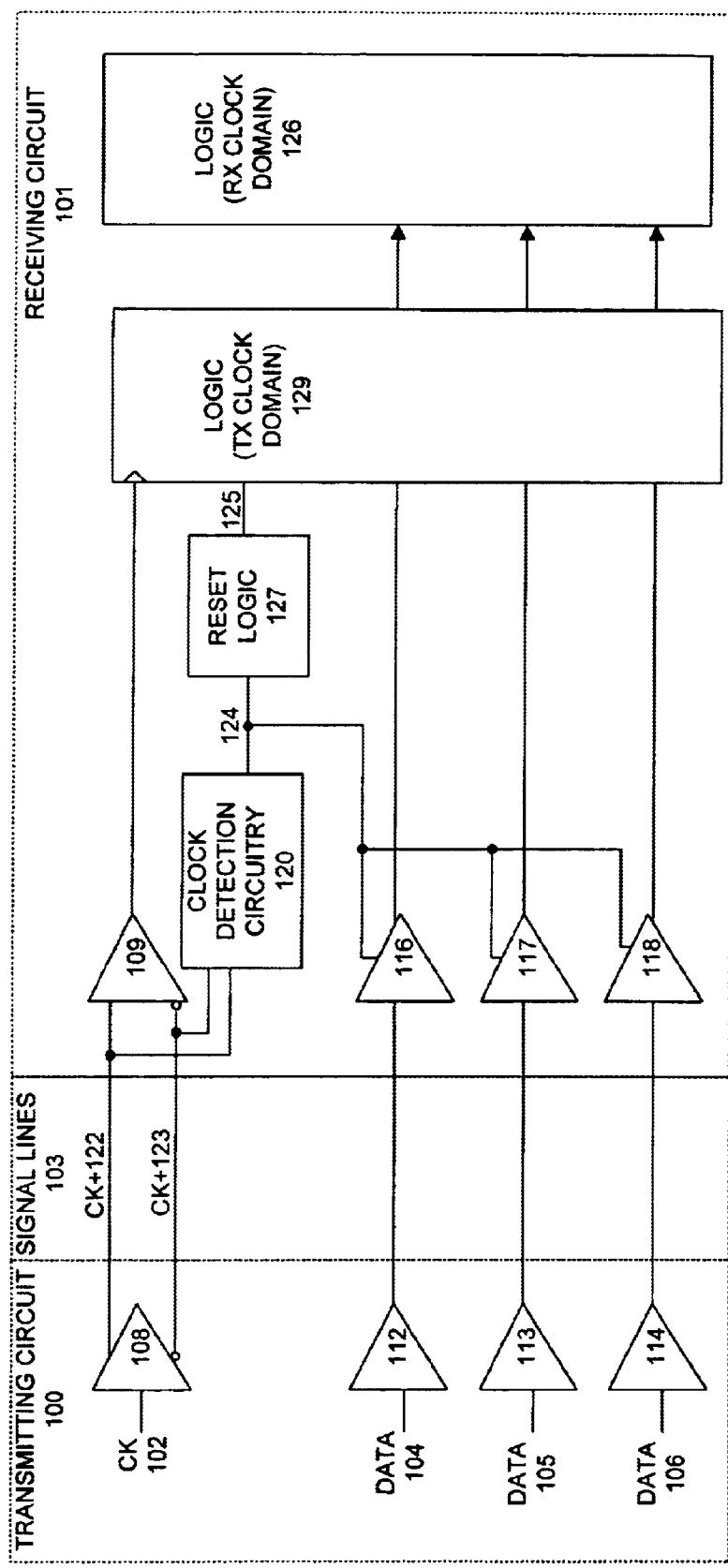
FIG. 1 illustrates data transfer circuitry in accordance with an embodiment of the present invention.

FIG. 1 illustrates data transfer circuitry in accordance with an embodiment of the present invention. The data transfer circuitry illustrated in FIG. 1 can generally include any type of source synchronous data transfer circuitry within a digital system, such as a computer system. The circuitry in FIG. 1 includes a transmitting circuit 100, which sends data across signal lines 103 to a receiving circuit 101. In one embodiment of the present invention, transmitting circuit 100 is located on a first circuit board, receiving circuit 101 is located on a second circuit board, and signal lines 103 are bus lines within a backplane that electrically couple the first circuit board with the second circuit board.

Transmitting circuit 100 includes a differential driver 108 for sending a clock signal 102 from transmitting circuit 100 to receiving circuit 101. Transmitting circuit 100 also includes a number of other drivers 112–114 for transmitting data signals 104–106 from transmitting circuit 100 to receiving circuit 101. Note that driver 108 can either be a differential driver, as is illustrated in FIG. 1, or alternatively a single-ended driver. Similarly, drivers 112–114 can either be single-ended drivers, as is illustrated in FIG. 1, or alternatively, differential drivers.

Receiving circuit 101 includes differential receiver 109, for receiving two components of the differential clock signal, CK+ 122 and CK− 123. After the clock signal is received, it is used to clock logic 129, which operates in the clock domain of the transmit clock within receiving circuit 101. Note that data is transferred from logic 129 into other logic 126, which operates in the clock domain of receiving circuit 101.

Receiving circuit 101 also includes receivers 116–118 for receiving data signals 104–106. These receivers 116–118 route data into logic 129, which is clocked by the transmit clock.

The two components of the differential clock signal, CK+ 122 and CK− 123, also feed into clock detection circuitry 120, which determines whether or not the differential clock signal is valid. If the differential clock signal is valid, clock detection circuitry 120 asserts a valid signal 124 to indicate that the received clock signal is valid.

Valid signal 124 feeds into enable inputs (which can be power cut inputs) of receivers 116–118 to cut off receivers 116–118, if the received clock signal is not valid. Valid signal 124 also feeds into reset logic 127, which generates one or more reset signals 125, that are used to reset portions of logic 129, if necessary.

Clock Detection Circuitry

Figure 2:
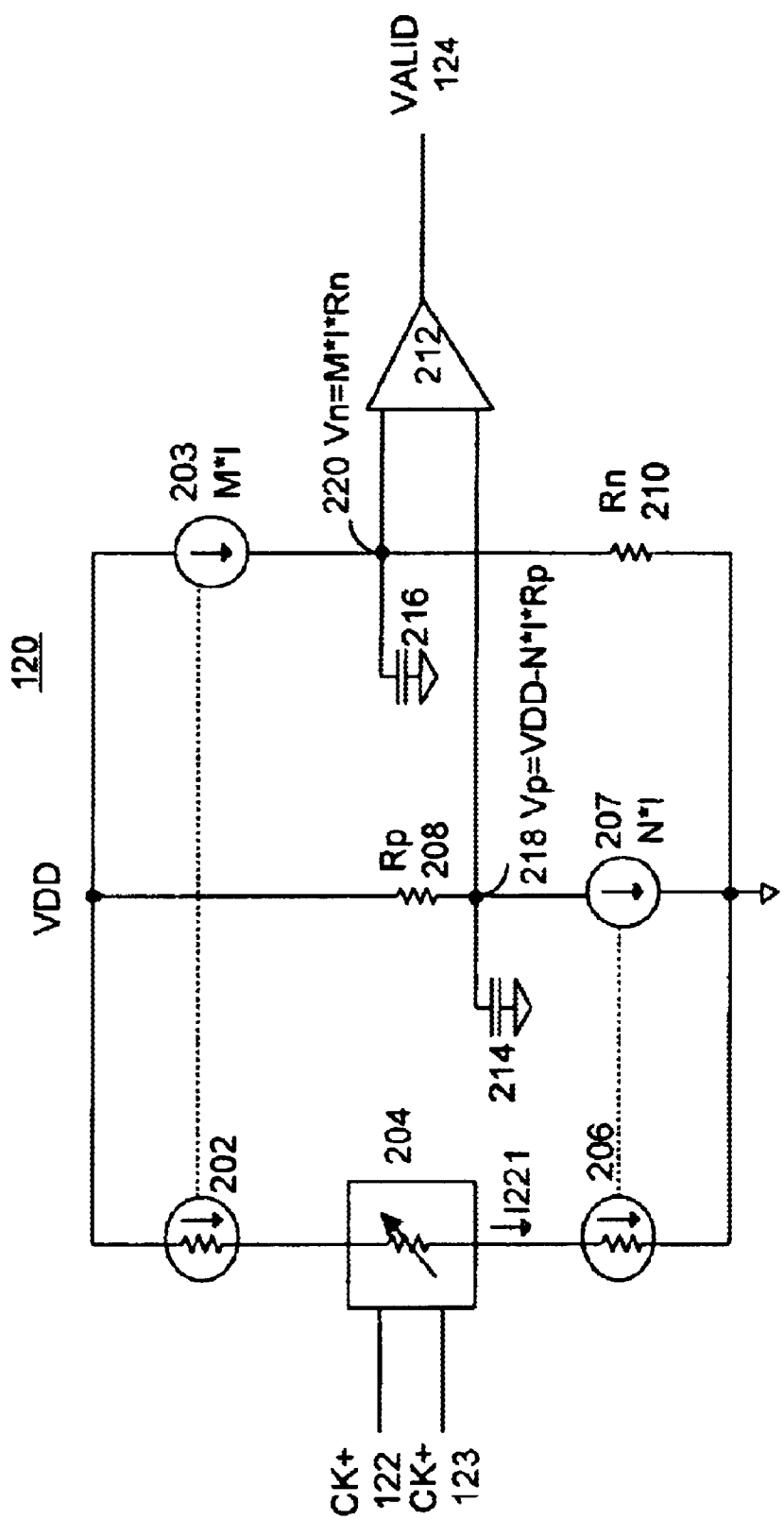
FIG. 2 illustrates clock detection circuitry in accordance with an embodiment of the present invention.

FIG. 2 illustrates clock detection circuitry 120 in accordance with an embodiment of the present invention. Within clock detection circuitry 120, differential clock signals, CK+ 122 and CK− 123, feed into control inputs of voltage-controlled resistor 204. By varying the resistance through resistor 204, signals CK+ 122 and CK− 123 control a first current I 221 through resistor 204.

The current I 221 feeds through a first current mirror circuit comprised of circuit elements 202 and 203 to create a second current M*I through circuit element 203 and resistor $R_N$ 210.

Current I 221 also feeds through a second mirror circuit comprised of circuit elements 206 and 207 to create a third current N*I through circuit element 207 and resistor $R_P$ 208.

A first input of differential amplifier 212 is coupled to node 218, which has a voltage of $V_P = V_{DD} - N*I*R_P$, and a second input of differential amplifier 212 is coupled to node 220, which has a voltage of $V_N = M*I*R_N$. The output of differential amplifier becomes valid signal 124.

Note that periodic fluctuations in valid signal 124 are filtered out by capacitors 216 and 214.

Figure 3:
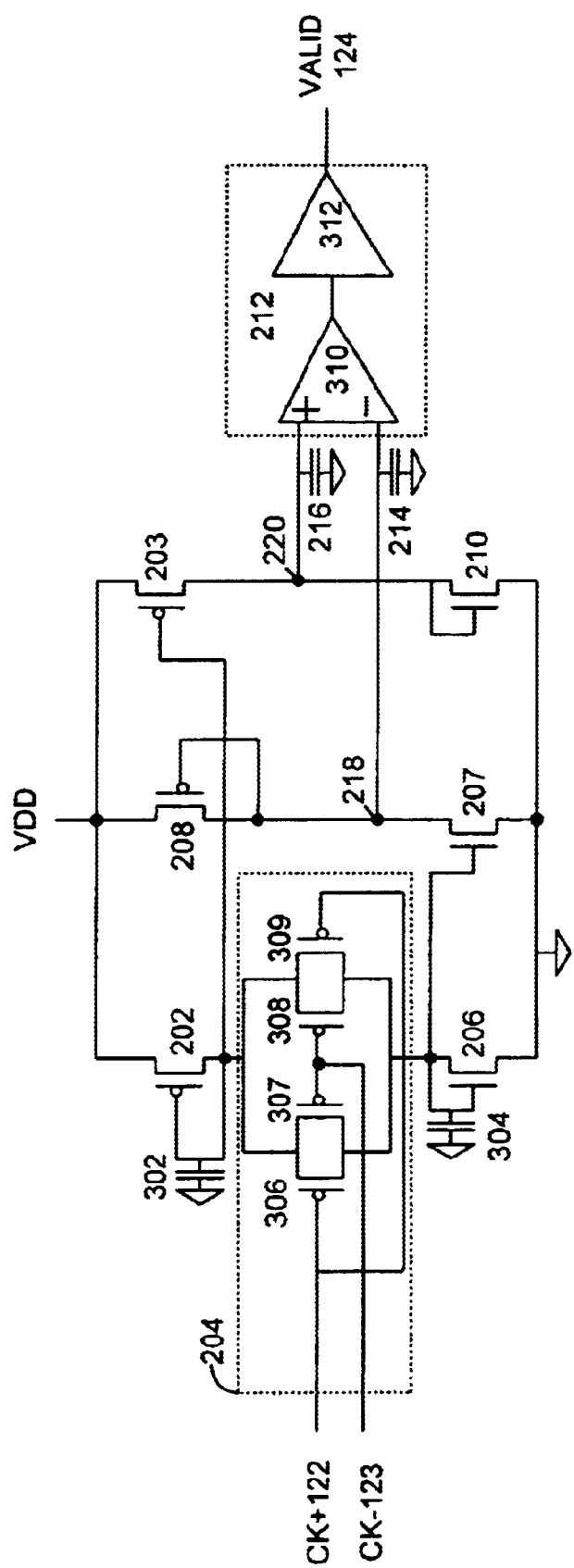
FIG. 3 provides a more-detailed illustration of the clock detection circuitry illustrated in FIG. 2 in accordance with an embodiment of the present invention.

FIG. 3 provides a more-detailed illustration of the clock detection circuitry illustrated in FIG. 2 in accordance with an embodiment of the present invention. Note that variable resistor 204 is implemented by P-type transistors 306–309 that operate in parallel. More specifically, signal CK+ 122 feeds into the gate inputs of P-type transistors 306 and 309, and signal CK− 123 feeds into the gate inputs of P-type transistors 307 and 308.

Note that if either signal CK+ 122 or CK− 123 becomes disconnected and is floating, the attached P-type transistors will not enter a low impedance state. Consequently, the average resistance through P-type transistors 306–309 becomes higher. This property is used to detect a disconnected signal line.

Also note that first mirror circuit elements 202 and 203 are implemented by P-type transistors 202 and 203, and second mirror circuit elements 206 and 207 are implemented by N-type transistors 206 and 207.

Furthermore, resistor $R_P$ 208 is implemented by P-type transistor 208, and resistor $R_N$ 210 is implemented by N-type transistor 210.

Finally, differential amplifier 212 is implemented by differential amplifier 310 and a second amplifier 312, which is used to ensure that valid signal 124 switches from rail to rail.

Operation of Clock Detection Circuitry

Figure 4:
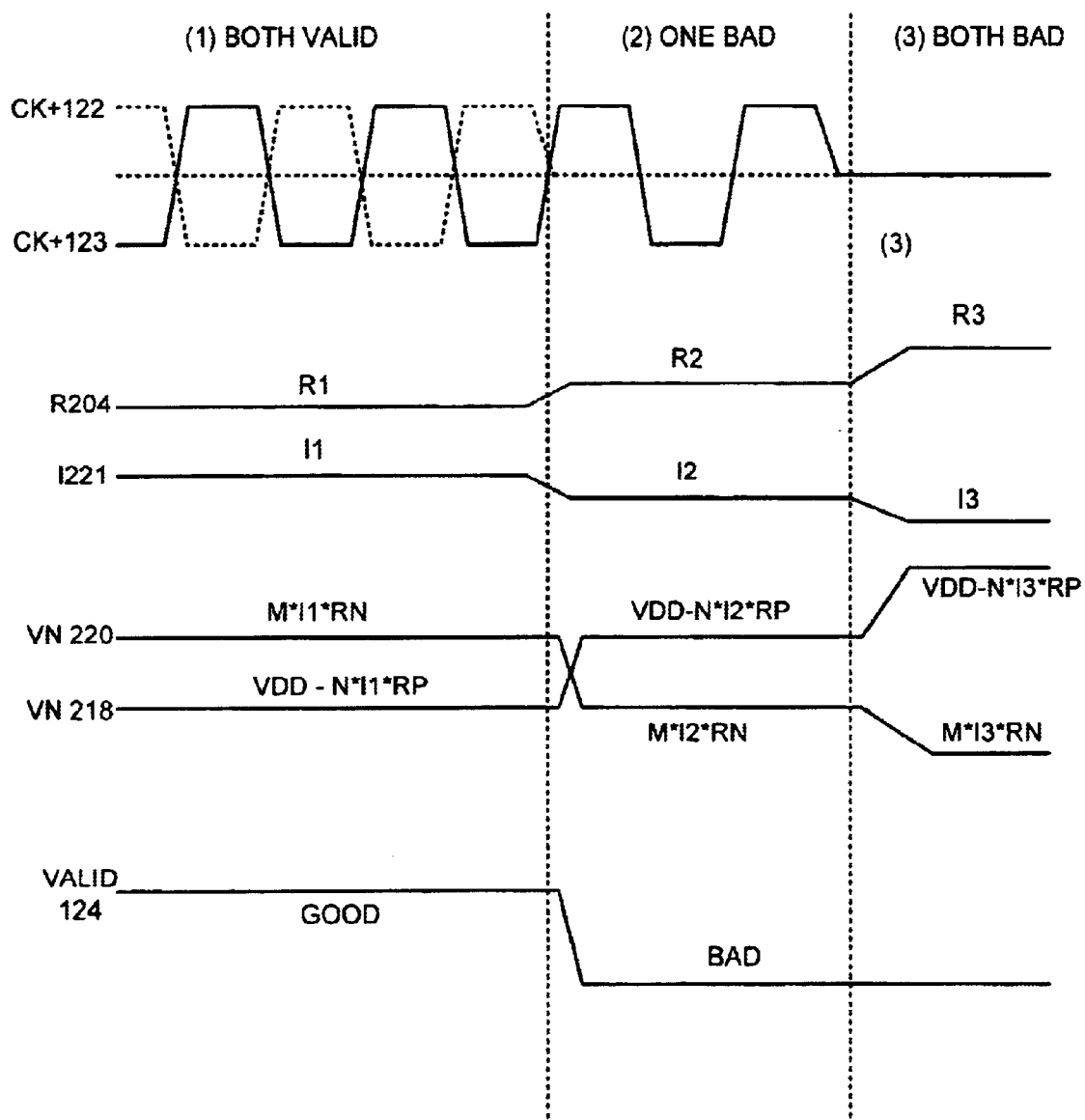
FIG. 4 illustrates the operation of the clock detection circuitry illustrated in FIG. 3 accordance with an embodiment of the present invention.

FIG. 4 illustrates the operation of the clock detection circuitry 120 illustrated in FIG. 3 in accordance with an embodiment of the present invention. FIG. 4 illustrates three regions of operation. In a first region, on the left-hand side of FIG. 4, both clock signals CK+ 122 and CK− 123 are valid. In a second region, in the middle of FIG. 4, one of the clock signals CK+ 122 and CK− 123 is bad and the other is valid. In a third region, on the right-hand side of FIG. 4, both clock signals CK+ 122 and CK− 123 are bad.

In the first region of operation, at any given time at least one of clock signals CK+ 122 and CK− 123 is at or near a low voltage level. This means that at least two of the four transistors 306–309 are in a low impedance state. Hence, the overall resistance of variable resistor 204 is at a relatively low value, $R_1$. This causes a relatively large current I1 through variable resistor 204. This relatively large current I1, causes node 220 to have a higher voltage, $V_N = M*I_1*R_N$, than node 218, which has a voltage $V_P = V_{DD} = N*I_3*R_P$. Hence, valid signal 124, which is the output of differential amplifier 212, has a high value indicating that both clock signals are valid.

In the second region of operation, one of clock signals CK+ 122 and CK− 123 is bad. This means only one of clock signals CK+ 122 and CK− 123 is periodically reaching a low voltage level. Hence, the average resistance through variable resistor 204 is a higher value, $R_2$, which causes a smaller average current, $I_2$. through resistor 204. (Note that capacitors 302 and 304 in FIG. 3 smooth out periodic variations in current $I_2$.) This causes node 220 to have a lower voltage, $V_N = M*I_2*R_N$, than node 218, $V_P = V_{DD} = N*I_2*R_P$. Hence, valid signal 124 has a low value indicating that at least one of the clock signals CK+ 122 and CK− 123 is not valid.

In the third region of operation, both clock signals CK+ 122 and CK− 123 are bad. This means that neither of clock signals CK+ 122 and CK− 123 reaches a low voltage level. Hence, the average resistance through variable resistor 204 is a very high, $R_3$, which causes a very small current $I_3$ through resistor 204. This again causes node 220 to have a lower voltage, $V_N = M*I_3*R_N$, than node 218, $V_P = V_{DD} = N*I_3*R_P$. Hence, valid signal 124 similarly assumes a low value.

Note that the values of resistors $R_P$ 208 and $R_N$ 210 can alternatively be adjusted so that valid signal 124 discriminates between the second region, wherein only one clock line is invalid, and the third region, wherein both clock lines are invalid.

Figure 5:
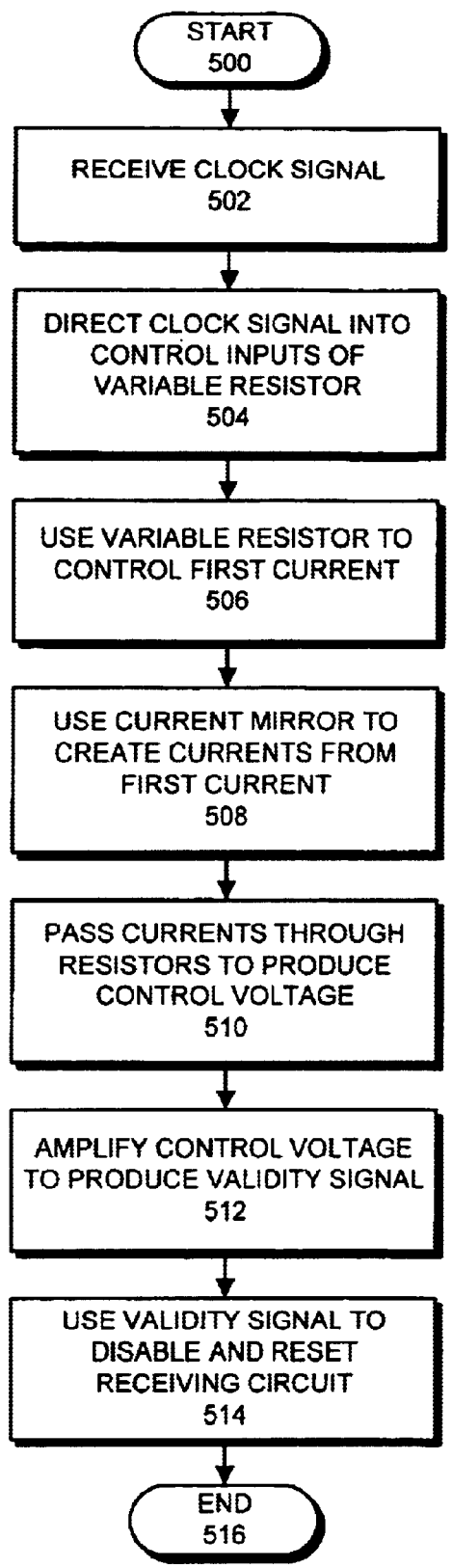
FIG. 5 is a flow chart illustrating the clock detection process in accordance with an embodiment of the present invention.

FIG. 5 is a flow chart illustrating the clock detection process in accordance with an embodiment of the present invention. The system first receives a clock signal (step 502), and then directs the clock signal into control inputs of variable resistor 204 (step 504).

Next, the system uses variable resistor 204 to control a first current (step 506). This first current feeds through circuitry 202 and 203 for the first current mirror to produce a second current current M*I through node 220. This first current also feeds through circuitry 206 and 207 for the second current mirror to produce a third current N*I through node 218 (step 508).

These currents M*I and N*I are then used to produce a control voltage by passing them through resistors $R_N$ 210 and $R_P$ 208, respectively (step 510). This results in a voltage of $V_P = V_{DD} = N*I*R_P$ at node 218, and a voltage of $V_N = M*I*R_N$ at node 220.

The difference between the voltages at nodes 218 and 220 is amplified through differential amplifier 212 to produce valid signal 124 (step 512).

Finally, valid signal 124 is used to disable and/or reset portions receiving circuit 101 as is illustrated in FIG. 1 (step 514).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting a valid clock signal at a clock receiver, comprising:

receiving a clock signal at the clock receiver;

directing the clock signal into a control input of a voltage-controlled variable resistor;

using the voltage-controlled variable resistor to control a first current;

using a current mirror to create a second current from the first current;

passing the second current through a resistor to produce a control voltage; and amplifying the control voltage to produce a validity signal indicating whether the clock signal is valid.

2. The method of claim 1, further comprising filtering out periodic fluctuations in the validity signal by using at least one capacitor to filter out fluctuations at a frequency of the clock signal.

3. The method of claim 1, wherein the clock signal is a differential clock signal that includes a first clock signal and a second clock signal;

wherein the voltage-controlled variable resistor includes a first variable resistor in parallel with a second variable resistor; and wherein directing the clock signal into the control input of the voltage controlled variable resistor involves directing the first clock signal into a control input of the first variable resistor and directing the second clock signal into a control input of the second variable resistor.

4. The method of claim 3, wherein an implementation of the resistor includes a first resistor, and wherein the current mirror includes:

a first P-type transistor with a drain coupled to $V_{DD}$ and a source and a gate coupled to a first end of the voltage-controlled variable resistor, so that the first current flows through the first P-type transistor;

a second P-type transistor with a drain coupled to $V_{DD}$, a gate coupled to the first end of the voltage-controlled variable resistor, and a source coupled to a first node and then to ground through the first resistor, so that the second current flows through the second P-type transistor and is proportionate to the first current; and wherein the first node provides a first portion of the control voltage.

5. The method of claim 4, wherein the implementation of the resistor includes a second resistor, and wherein the current mirror further includes:

a first N-type transistor with a drain coupled to ground and a source and a gate coupled to a second end of the voltage-controlled variable resistor, so that the first current flows through the first N-type transistor; and a second N-type transistor with a drain coupled to ground, a gate coupled to the second end of the voltage-controlled variable resistor, and a source coupled to a second node and then to $V_{DD}$ through the second resistor, so that a third current flows through the second N-type transistor and is proportionate to the first current; and wherein the second node provides a second portion of the control voltage.

6. The method of claim 5, wherein amplifying the control voltage to produce the validity signal involves using a differential receiver with a first input coupled to the first node and a second input coupled to the second node to produce the validity signal at an output of the differential receiver.

7. The method of claim 6, wherein the first resistor and the second resistor are sized so that validity signal is asserted when both the first clock signal and the second clock signal are valid.

8. The method of claim 6, wherein the first resistor and the second resistor are sized so that validity signal is asserted when at least one of the first clock signal and the second clock signal is valid.

9. The method of claim 1, wherein the voltage-controlled variable resistor is implemented using at least one P-type transistor, wherein a gate input of the P-type transistor functions as the control-input of the voltage-controlled variable resistor.

10. The method of claim 1, wherein the method further comprises using the validity signal to disable a data receiving circuit associated with the clock signal when the clock signal is not valid.

11. A method for detecting a valid clock signal at a clock receiver, comprising:

receiving a clock signal at the clock receiver;

directing the clock signal into a control input of a voltage-controlled variable resistor;

wherein the voltage-controlled variable resistor remains in a high impedance state when the clock signal is floating;

using the voltage-controlled variable resistor to control a first current;

using the first current to produce a control voltage;

amplifying the control voltage to produce a validity signal indicating whether the clock signal is valid; and filtering out periodic fluctuations in the validity signal by using at least one capacitor to filter out fluctuations at a frequency of the clock signal.

12. An apparatus that detects a valid clock signal at a clock receiver, comprising:

an input that receives a clock signal;

a voltage-controlled variable resistor with a control input coupled to the clock signal;

a current mirror that is configured to create a second current from a first current passing through the voltage-controlled variable resistor;

a resistor coupled to the current mirror so that the second current passes through the current mirror to produce a control voltage; and an amplifier that is configured to amplify the control voltage to produce a validity signal indicating whether the clock signal is valid.

13. The apparatus of claim 12, a filter that is configured to filtering out periodic fluctuations in the validity signal at a frequency of the clock signal.

14. The apparatus of claim 13, wherein the clock signal is a differential clock signal that includes a first clock signal and a second clock signal;

wherein the voltage-controlled variable resistor includes a first variable resistor in parallel with a second variable resistor;

wherein the first clock signal is coupled to a control input of the first variable resistor; and wherein the second clock signal is coupled to a control input of the second variable resistor.

15. The apparatus of claim 14, wherein an implementation of the resistor includes a first resistor, and wherein the current mirror includes:

a first P-type transistor with a drain coupled to $V_{DD}$ and a source and a gate coupled to a first end of the voltage-controlled variable resistor, so that the first current flows through the first P-type transistor;

a second P-type transistor with a drain coupled to $V_{DD}$, a gate coupled to the first end of the voltage-controlled variable resistor, and a source coupled to a first node and then to ground through the first resistor, so that the second current flows through the second P-type transistor and is proportionate to the first current; and wherein the first node provides a first portion of the control voltage.

16. The apparatus of claim 15, wherein the implementation of the resistor includes a second resistor, and wherein the current mirror further includes:

a first N-type transistor with a drain coupled to ground and a source and a gate coupled to a second end of the voltage-controlled variable resistor, so that the first current flows through the first N-type transistor;

a second N-type transistor with a drain coupled to ground, a gate coupled to the second end of the voltage-controlled variable resistor, and a source coupled to a second node and then to $V_{DD}$ through the second resistor, so that a third current flows through the second N-type transistor and is proportionate to the first current; and wherein the second node provides a second portion of the control voltage.

17. The apparatus of claim 16, wherein the amplifier includes a differential receiver with a first input coupled to the first node and a second input coupled to the second node to produce the validity signal at an output of the differential receiver.

18. The apparatus of claim 17, wherein the first resistor and the second resistor are sized so that validity signal is asserted when both the first clock signal and the second clock signal are valid.

19. The apparatus of claim 17, wherein the first resistor and the second resistor are sized so that validity signal is asserted when at least one of the first clock signal and the second clock signal is valid.

20. The apparatus of claim 12, wherein the voltage-controlled variable resistor is implemented using at least one P-type transistor, wherein a gate input of the P-type transistor functions as the control-input of the voltage-controlled variable resistor.

21. The apparatus of claim 12, further comprising a disabling circuit coupled to the validity signal to that is configured to disable a data receiving circuit associated with the clock signal if the clock signal is not valid.

22. An apparatus that detects a valid clock signal at a clock receiver, comprising:

an input that receives a clock signal;

a voltage-controlled variable resistor with a clock input coupled to the clock signal;

wherein the voltage-controlled variable resistor is configured to remain in a high impedance state when the clock signal is floating;

a current control circuit that uses the voltage-controlled variable resistor to produce a control current;

a resistor coupled to the current control circuit so that the control current passes through the resistor to produce a control voltage; and an amplifier that is configured to amplify the control voltage to produce a validity signal indicating whether the clock signal is valid.

* * * * *